R. SUMMERSGILL.
POTATO HARVESTER.
APPLICATION FILED FEB. 8, 1917.
1,245,526.
Patented Nov. 6, 1917.
3 SHEETS—SHEET 2.
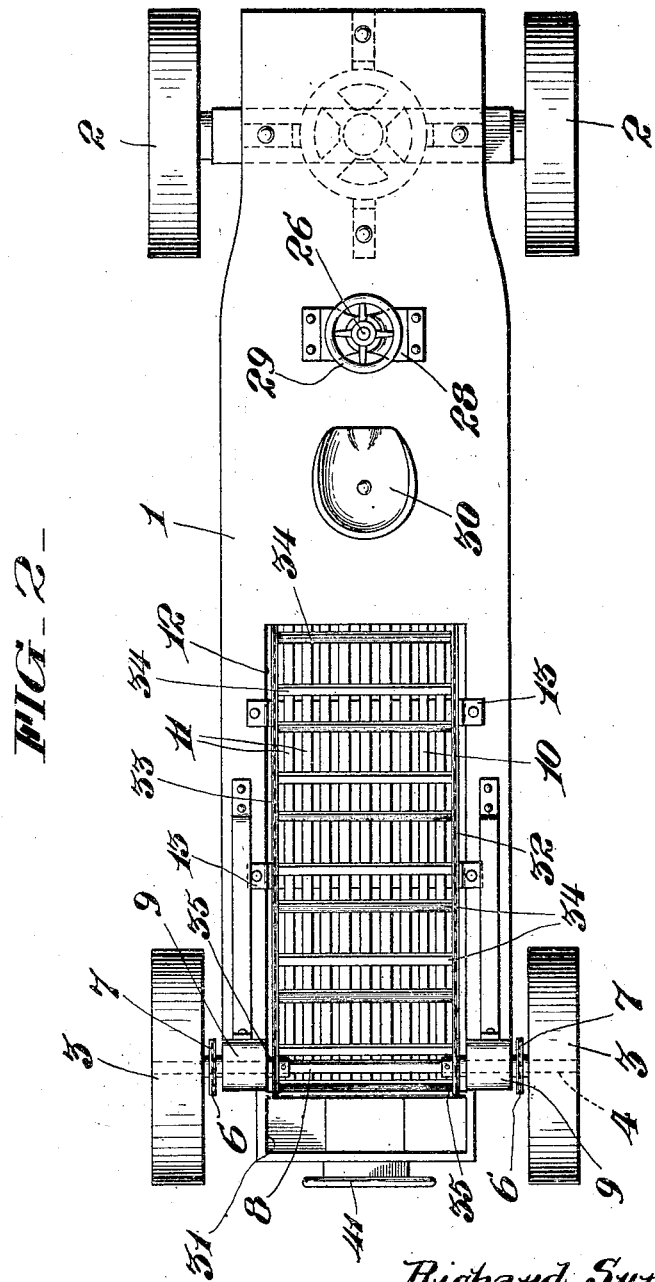
Inventor
Richard Summersgill,
Witness
Wm. Conway.
By Foster and Webster
his Attorneys

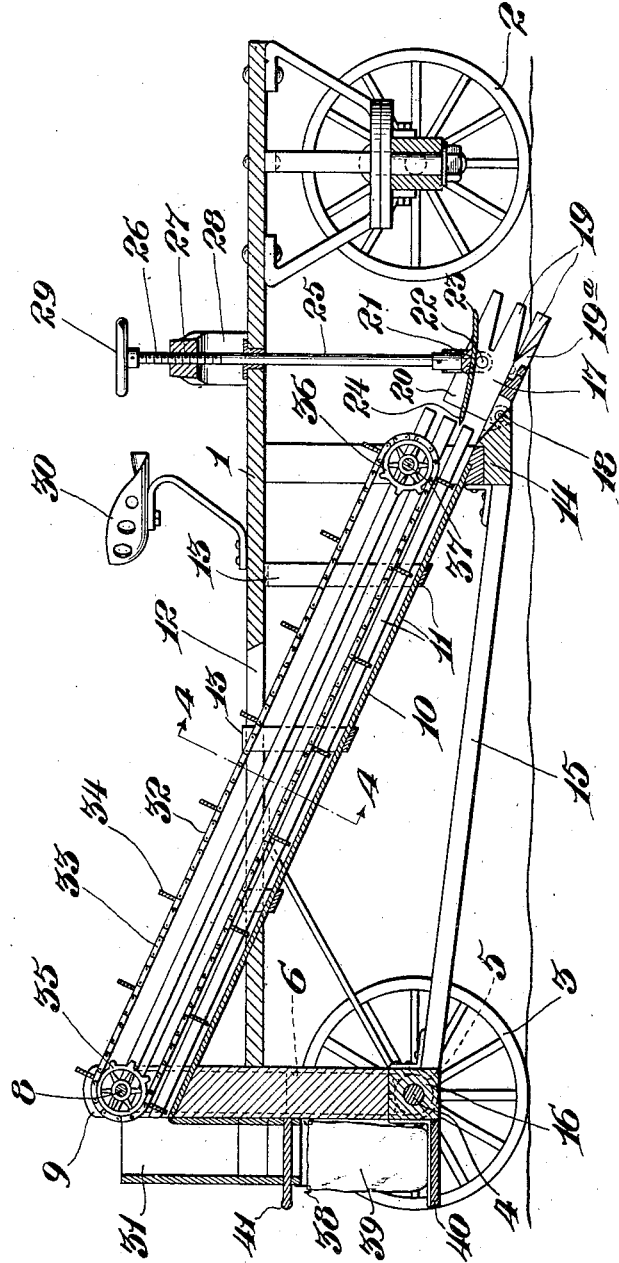

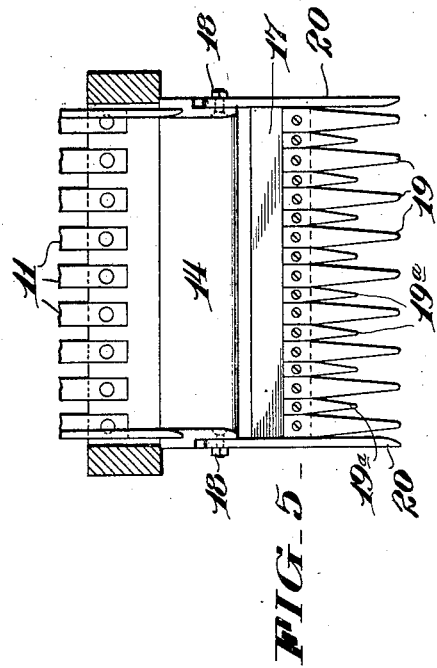
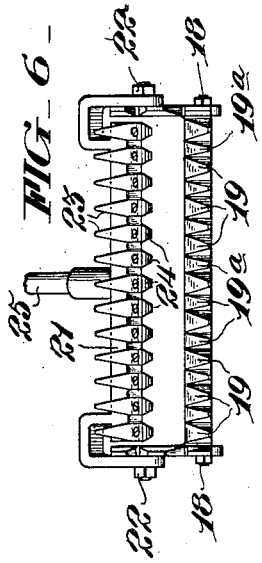
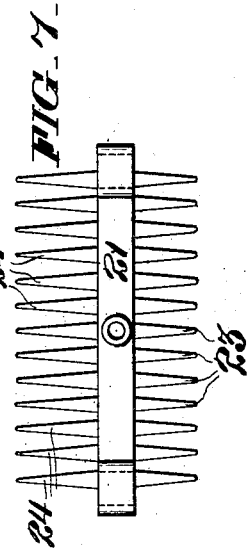
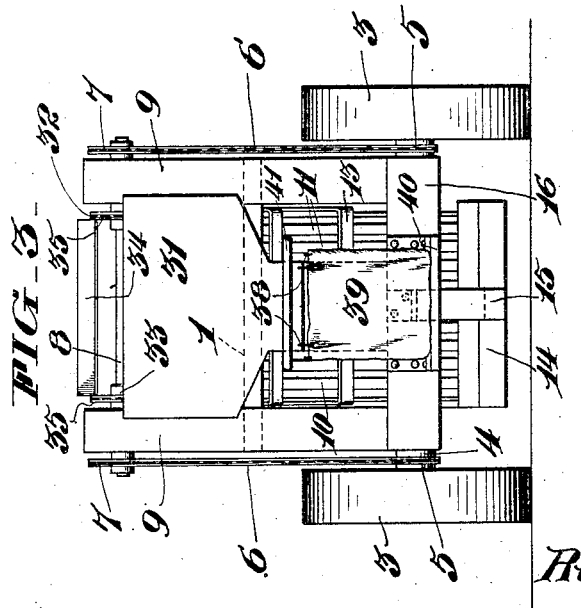
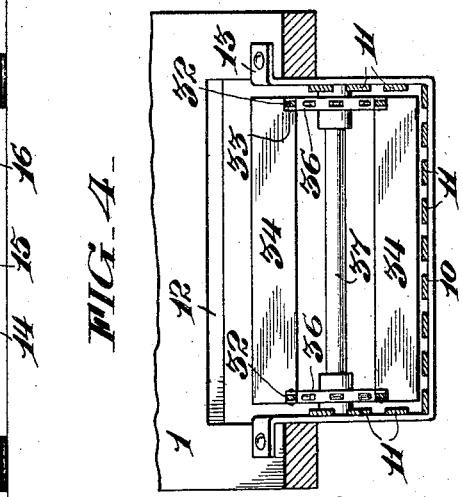

UNITED STATES PATENT OFFICE.

RICHARD SUMMERSGILL, OF KANE, PENNSYLVANIA.

POTATO-HARVESTER.

1,245,526.  Specification of Letters Patent.  Patented Nov. 6, 1917.

Application filed February 8, 1917. Serial No. 147,287.

*To all whom it may concern:*

Be it known that I, RICHARD SUMMERSGILL, a citizen of the United States, residing at Kane, in the county of McKean and State of Pennsylvania, have invented certain new and useful Improvements in Potato-Harvesters, of which the following is a specification.

My invention relates to improvements in potato harvesters, an object of the invention being to provide a machine which, when drawn over the ground will operate to dig the potatoes and convey them into bags or other receptacles, and so simplify the operation, that two men, one at the front and the other at the rear can conveniently operate the harvester.

A further object is to provide improved means for digging the potatoes, which is capable of adjustment to suit conditions, and which compels the potatoes to move rearwardly into the path of a conveyer while allowing the dirt to fall out of the way.

With these and other objects in view the invention consists in certain novel features of construction and combinations and arrangements of parts as will be more fully hereinafter described and pointed out in the claims.

In the accompanying drawings:

Figure 1 is a view in longitudinal section illustrating my improvements.

Fig. 2 is a top plan view.

Fig. 3 is a rear end view.

Fig. 4 is a view in transverse section on the line 4—4 of Fig. 1.

Fig. 5 is a sectional plan view of the digger with the bail removed.

Fig. 6 is a view in front elevation looking directly into and slightly at an angle down upon the digger and the digger bail.

Fig. 7 is a plan view of the digger bail.

1 represents a platform supported by front and rear wheels 2 and 3 respectively. The rear wheels 3 are secured to an axle 4, and sprocket wheels 5 on the axle 4 are connected by chains 6 with sprocket wheels 7 on a horizontal shaft 8, the latter supported in standards 9 at the rear end of platform 1.

10 represents an inclined chute made up of longitudinal and transverse slats 11. This chute 10 extends through a slot 12 in platform 1, and is supported by suitable hangers 13 with the front lower end of the chute secured to a transverse bar 14.

A longitudinal beam 15 connects the bar 14 with the bearings 16 of rear axle 4 so as to sustain the end thrust and give the necessary strength and stability to the structure.

My improved digger 17 is pivotally connected to the bar 14 by hinge pins 18, and at its forward edge is provided with two series of teeth 19 and 19$^a$. The teeth 19 are relatively long, and the teeth 19$^a$ are relatively short and are located between the teeth 19. All of said teeth are removably secured to the digger so that they can be replaced whenever desired.

The sides of the digger 17 project upwardly as shown at 20, whereby the digger is in the form of a shovel or scoop to confine the potatoes and direct them rearwardly on to the chute 10. A bail 21, which I shall term a digger bail, is pivotally connected at its ends to the sides 20 by means of bolts 22, which latter can be easily removed when desired.

The bail 21 is provided with forwardly and rearwardly projecting teeth 23 and 24 respectively. All of these teeth curve longitudinally, and the rear teeth 24 are preferably shorter than the front teeth 23. These teeth 23 and 24 serve to prevent the potatoes from moving upwardly and out of the digger, but compel the potatoes to move rearwardly onto the chute 10, at the same time the teeth permit the dirt to pass between them and fall on to the ground.

A vertical rod 25 has swiveled connection at its lower end to the bail 21, and this rod projects through platform 1, and at its upper screw-threaded end 26 engages a threaded opening 27 in a yoke 28, and is provided with a hand wheel 29 located conveniently with relation to a driver's seat 30 so that by turning the wheel 29, the digger 17 and the digger bail 21 can be adjusted to properly position them for best results.

A hopper 31 is located at the rear end of platform 12 into which the chute 10 directs the potatoes. An endless conveyer 32 consisting of sprocket chains 33 and plates 34, operates above the chute 10 to move the potatoes up the chute and into hopper 31. The chains 33 are supported on sprocket wheels 35 on shaft 8 and on sprocket wheels 36 on a shaft 37 supported at the lower end of chute 10.

The hopper 31 at its lower smaller end is provided with hooks 38 to receive a bag 39, and a platform 40 supports the weight of the bag relieving the hooks 38.

A gate 41 is provided in the lower end of hopper 31 so as to control the discharge of potatoes from the hopper into the bag. When the harvester is in operation, one man can control the draft of the machine and also can adjust the digger to suit conditions, while a second man at the rear of the machine can care for the filling of the bags. The depth of digging is controlled by the angle of the digger, and the teeth of the digger bail 21 permit the dirt to escape while compelling the potatoes to pass rearwardly on to the chute 10.

The particular arrangement of teeth insures a breaking up of the soil without injuring the potatoes, and yet they prevent any escape of potatoes during the operation of the machine.

Various slight changes may be made in the general form and arrangements of parts described without departing from my invention and hence I do not limit myself to the precise details set forth, but consider myself at liberty to make such changes and alterations as fairly fall within the spirit and scope of the appended claims.

Having fully described my invention what I claim as new and desire to secure by Letters Patent is:

1. The combination with a potato harvester, of a digger, and a toothed supporting bail connected to the digger and located above the same.

2. The combination with a potato harvester, of a digger, said digger having alternate long and short teeth at its forward edge, a bail pivotally connected to the digger and having forwardly and rearwardly projecting teeth thereon, and means for raising and lowering the bail and digger.

3. The combination with a potato harvester, of a digger, said digger pivotally supported and having teeth at its forward edge and having upturned sides, a bail pivotally connected at its ends to the sides of the digger and having teeth at its front and rear edges, and means for raising and lowering the bail and digger.

4. The combination with a potato harvester, of a digger pivotally supported and having alternate long and short teeth at its forward edge, a bail pivotally connected to the digger and located above the same, teeth on said bail at its front and rear edges, an adjusting rod having a screw-threaded engagement with the harvester, said rod connected at its lower end to the bail, and having a hand wheel at its upper end.

In testimony whereof I have signed my name to this specification in the presence of two subscribing witnesses.

RICHARD SUMMERSGILL.

Witnesses:
JOSEPH KARCHER,
HENRY KARCHER.